M. L. GILMOUR.
PIPE AND IRON CUTTER.
APPLICATION FILED JAN. 12, 1914.
1,130,395.
Patented Mar. 2, 1915.
2 SHEETS—SHEET 1.
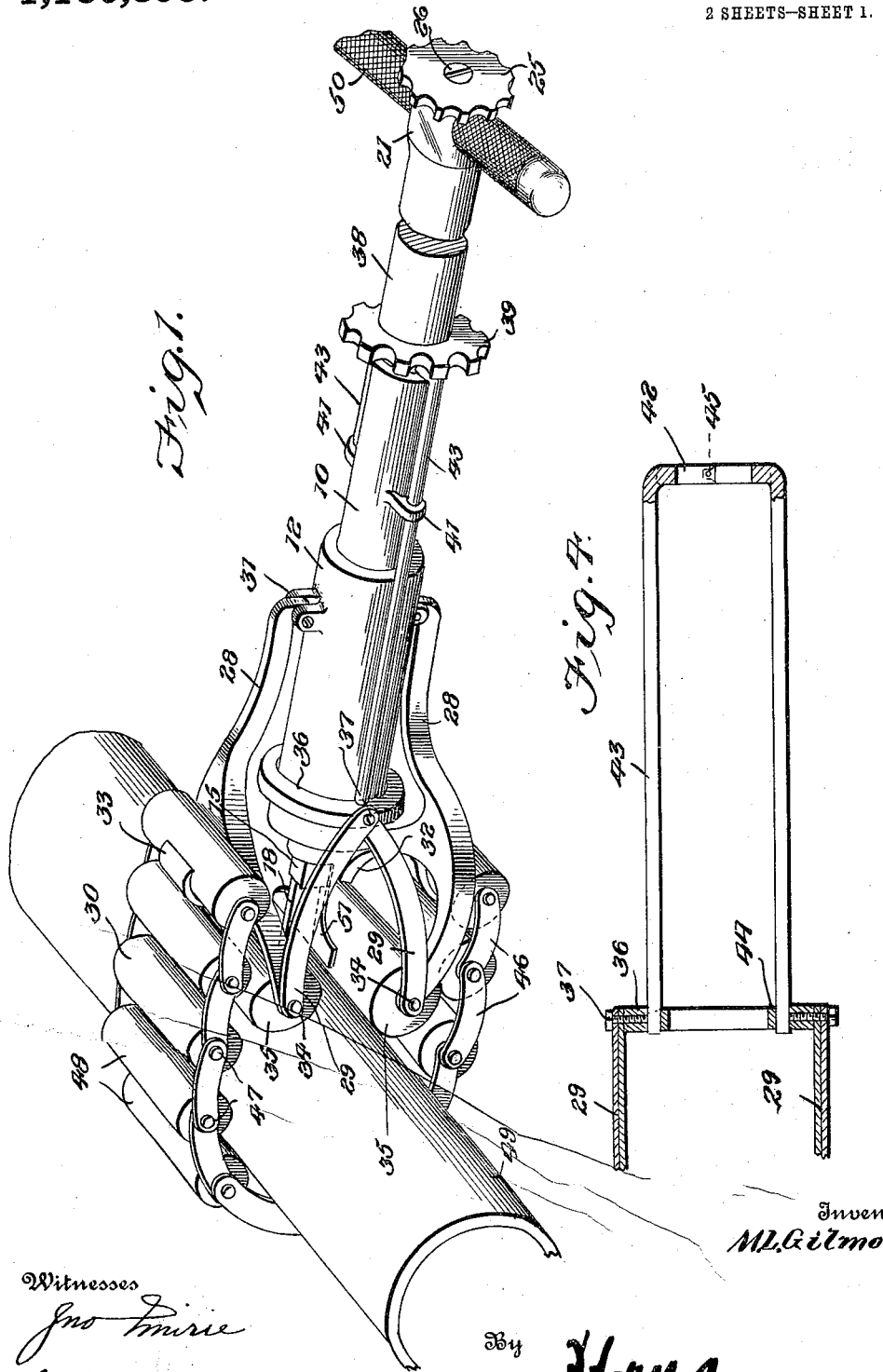
Inventor
M. L. Gilmour.
Witnesses M. L. GILMOUR.
PIPE AND IRON CUTTER.
APPLICATION FILED JAN. 12, 1914.
1,130,395.
Patented Mar. 2, 1915.
2 SHEETS—SHEET 2.
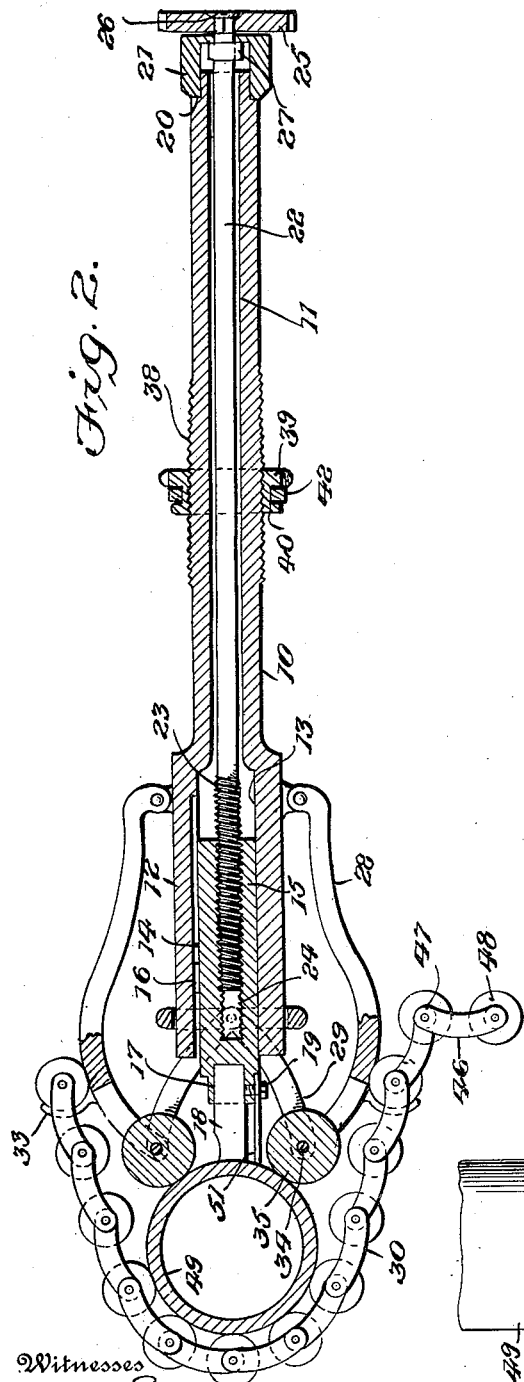
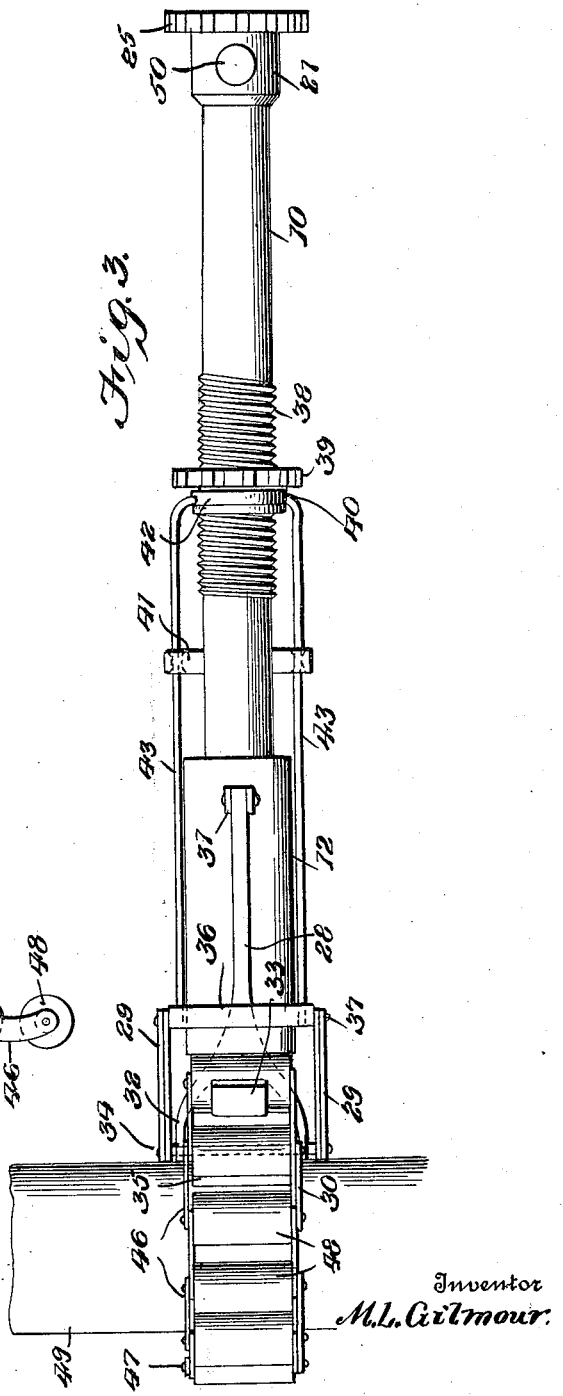

UNITED STATES PATENT OFFICE.

MARRIAM L. GILMOUR, OF DAVENPORT, IOWA.

PIPE AND IRON CUTTER.

1,130,395. Specification of Letters Patent. Patented Mar. 2, 1915.

Application filed January 12, 1914. Serial No. 811,657.

*To all whom it may concern:*

Be it known that I, MARRIAM L. GILMOUR, citizen of the United States, residing at Davenport, in the county of Scott and State of Iowa, have invented certain new and useful Improvements in Pipe and Iron Cutters, of which the following is a specification.

My invention relates to metallic pipe and rod cutting tools, being primarily intended for use as an iron pipe cutter, the chief object of my invention being the provision of a pipe cutter employing a cutting tool similar to that employed in the ordinary turning lathes in order that the pipe may be cut cleanly and without undue compression of the cut edges.

Practically all pipe cutting tools now in use employ either rotary cutters or cutters of other types in which the cutting action is dependent wholly upon the pressure of the cutting blade or element against the pipe being cut, the result being that the ends of the pipe sections, when cut, are turned inwardly and the internal diameter of the pipe sections, at their ends, therefore reduced, with the result that it is more difficult to couple the pipe sections together when desired, and the further result that the raw edges thus left cut into and destroy any packing rings interposed between adjacent pipe ends. My improved pipe cutter is primarily intended to overcome these disadvantages by the employment of a cutting tool of the type used in metallic lathe work in which the pressure of the tool against the material being cut need be but slight in order to permit proper operation.

A further object of my invention is to construct a tool of the above described character which may be hand operable and which will require the application of but little force in its employment.

A still further object of my invention is the provision of a cutting tool so constructed that it may be readily clamped to the pipe, rod or other work operated upon, thereby doing away with the necessity of positively holding the tool in place during use. In this connection I provide co-acting gripping jaws and a flexible chain connecting the jaws and adapted to pass about the pipe or rod being cut, the jaws being so arranged that any desired degree of tension may be applied to the chain when the latter is in place.

A further object of my invention therefore consists in the provision of work engaging bearings for the gripping jaws and chains so constructed and arranged as to reduce to a minimum all friction between the tool and the work being operated upon.

A still further object of my invention consists in the provision of a positive, manually operated feed mechanism for advancing the cutting member of the tool as the depth of the cut progresses. And a still further object of my invention is the provision of a chip guard or apron adjacent the cutting member or blade arranged to prevent the passage of chips or shavings cut from the pipe or rod beneath the gripping chain.

With these and other objects in view, my invention will be more fully described, illustrated in the accompanying drawings, and then specifically pointed out in the claims which are attached to and form a part of this application.

In the drawings:—Figure 1 is a perspective view of my improved tool in use, a portion of the tool stock being broken away to permit the showing of the tool upon a larger scale; Fig. 2 is a central longitudinal sectional view of the structure shown in Fig. 1; Fig. 3 is a plan view of the tool; Fig. 4 is a detail view, partly in section, of the controlling mechanism for the gripping jaws of the tool.

Corresponding and like parts are referred to in the following description and indicated in all the views of the drawings by the same reference characters.

The preferred embodiment of my invention, as illustrated in the drawings, includes a body portion or stock indicated as a whole by the numeral 10, this body member being tubular in construction to provide a longitudinal bore 11 and terminating at one end in an enlarged head 12 counterbored to provide a chuck receiving socket 13, this socket being formed with a longitudinally extending keyway 14. Slidably mounted in the socket 13 is a tool chuck 15 of any suitable type, being preferably formed circular in cross section and provided with a shoulder 16 slidably seating in the keyway 14 to prevent turning of the chuck in the socket.

The outer end of the chuck 15 is preferably somewhat reduced and is recessed as at 17 to seat the inner end of a conventional cutting tool 18 of the type commonly employed in metallic turning lathes, this cutting tool being normally held in place by a set bolt 19. The opposite end of the body portion or stock 10 of my improved tool is reduced to provide an annular stop shoulder 20 to seat the inner edge of a cap or thimble 21. A feed screw 22 is rotatably mounted in the bore 11 of the stock with one end threaded as at 23 for engagement in the internally threaded, longitudinally extending bore or socket 24 of the chuck 15. The opposite end of the feed screw 22 extends through an opening in the cap or thimble 21 and is provided with any suitable form of hand wheel 25. That end of the feed screw 22 extending into the hub portion of the hand wheel is squared to prevent independent turning movement of the parts and the hand wheel is held against longitudinal displacement from the feed screw by means of a set screw 26 threaded into the end of the feed screw with its head engaging in a socket or countersunk recess formed in the outer face of the hand wheel. The feed screw 22, immediately within the cap or thimble 21 is provided with an annular shoulder 27 which engages against the inner face of the thimble and therefore prevents the feed screw from slipping out of the stock of the tool, the thimble 21 being either threaded or otherwise detachably secured to the stock.

From the foregoing description it will be apparent that the tool chuck, together with the cutting tool 18, may be, by proper turning of the hand wheel 25, withdrawn into the chuck socket 13 or extended any desired distance beyond the open end thereof. At the same time, the engagement of the shoulder 16 of the chuck in the keyway 14 of the chuck socket prevents any rotation of the chuck and consequent turning movement of the cutting member 18.

In order to provide means for holding the above described cutting tool in proper engagement with the pipe, rod or other work being operated upon, I provide coacting pairs of gripping jaws 28 and 29 and a gripping element or chain 30. To insure a clear understanding, during further explanation of my improved tool, the gripping jaws 28 will be designated as the primary gripping jaws, while the gripping jaws 29 will be termed the secondary gripping jaws.

The primary gripping jaws 28 are each pivoted between a pair of ears 31 formed integrally with the rear portion of the head 12 of the stock, the ears between which one of the jaws 28 is pivoted being diametrically located with respect to the ears between which the other jaw 28 is pivoted. Each of the gripping jaws extends outwardly and forwardly from its pivotal end to a point somewhat in advance of the stock head 12 and is then bifurcated to form spaced arms 32 which curve inwardly. Each of these primary gripping jaws 28 is provided adjacent the juncture of its arms 32 with an outwardly and rearwardly directed hook 33 to engage the gripping chain 30 as will be later explained. The free ends of the arms 32 of the gripping jaws 28 are perforated to receive shafts 34 upon which are journaled the work engaging rollers 35, these rollers being located between the arms of the jaws.

As best disclosed in Figs. 1 and 4, there are two pairs of secondary gripping jaws, diametrically located with respect to each other. A collar 36 slidably surrounds the stock head 12 of the tool and these secondary gripping jaws are pivotally connected at their inner ends to this collar by bolts 37, each bolt passing through the overlapping inner ends of one pair of the secondary gripping jaws. The free or outer ends of the secondary gripping jaws are perforated to receive the extended ends of the shafts 34, one jaw of each pair of secondary gripping jaws being pivotally connected to one of the shafts 34, while the other jaws of said pairs of jaws are connected to the other shaft 34. It will be readily apparent from the above description that any forward movement of the collar 36 will tend to move the rollers 35 away from each other and from the cutting tool 18, while any rearward movement of the collar will bring the rollers toward each other.

In order to provide means for predeterminedly moving the collar 36 along the chuck head 12 and for normally holding the same against such movement, the intermediate portion of the tool stock 10 is externally threaded, as shown at 38 to receive a hand wheel or nut 39 having a hub portion provided with a circumferential channel 40. The stock is further provided at diametrically opposite sides and at a point intermediate its threaded portion and the head 12 with radially extending, perforated ears 41, these ears being preferably formed to extend at right angles to the ears 31 between which the primary gripping jaws are pivoted.

A split ring 42 is rotatably mounted in the groove or channel 40 of the hub portion of the hand wheel or nut 39 and each part of this split ring is provided with a laterally directed extension or rod 43. These rods 43 pass through the perforated ears 41 and extend at their free ends into or through perforations 44 formed at diametrically opposite parts of the collar 36. The same set bolts 37 which secure the secondary gripping jaws to the collar 36 bear by their inner ends against the free ends of the rods 43 to lock them against disengagement from the collar 36. The abutting end portions of the split ring 42 are preferably dove-tailed or otherwise fitted together and secured against disengagement by pins 45.

From the foregoing description it will be clear that the turning of the hand wheel or adjusting nut 39 toward the forward end or head portion of the tool stock, will advance the collar 36 and spread the rollers 35, while opposite movement of the adjusting nut will tend to draw the rollers toward each other. The gripping chain which co-acts with the primary and secondary gripping jaws and rollers 35 and which has been previously indicated as a whole by the numeral 30, includes a plurality of arcuate side bars or links 46 arranged in spaced pairs with the overlapping ends of adjacent pairs pivotally connected by pintle pins or shafts 47. Each of these pintle pins or shafts 47 forms a journal for a roller bearing 48, the bearings being located between the side portions 46 of the chain and being so proportioned as to extend peripherally beyond such portions and to, at the same time, leave sufficient space between adjacent bearings to permit engagement of the chain upon the hooks 33 of the primary jaws in the manner shown in the drawings.

In order to insure an exact understanding of the application and employment of my improved cutting tool I have shown it in use as a pipe cutter, a section of pipe being shown at 49 and the tool being shown firmly clamped in place about the pipe. To apply the tool in the position shown, the hand wheel 25 is first turned to suitably retract the chuck 15 and tool 18 carried thereby and the adjusting nut 39 turned to spread the jaw carried rollers 35. The tool is then applied against the pipe to bring the cutting edge of the cutting member in engagement with the periphery of the pipe and the chain 30 engaged at one end upon one of the hooks 33 and passed about the pipe and engaged with the other hook 33, the chain being drawn as tight as possible. The adjusting nut 39 is then turned to move the rollers 35 toward each other and consequently into engagement with the outer face of the pipe 49. As soon as these rollers 35 come into engagement with the pipe they tend to force the pipe away from the tool and consequently bind the pipe firmly in place. It will therefore be seen that with the exception of the cutting edge of the cutting member 18, the sole engagement of the tool with the pipe is that of the rollers 35 carried by the gripping jaws and certain of the bearing rollers 48 of the gripping chain. It will therefore be clear that the tool may be rotated about the pipe by the application of relatively slight force. To cut the pipe, the tool is rotated continuously about the pipe in the same direction, the direction of rotation being dependent upon the position occupied by the cutting member 18. As the tool is rotated, the hand wheel 25 is turned from time to time to advance or feed the cutting member and so keep it in proper active engagement with the pipe.

In order to facilitate the proper manipulation of the tool, the cap or thimble 21 is preferably provided with diametrically extending hand grips 50 by which the tool may be conveniently grasped. To prevent chips or shavings cut from the pipe or other work being operated upon from passing under the rollers 35, or the rollers 48 of the chain, I provide a chip shield or apron 51 of leather or other flexible material which is secured at one end to the chuck 15 by the same set bolt 19 which secures the cutting member in place. The free end of this shield or apron is flared as best shown in Fig. 1 and rests against the peripheral face of the pipe, rod or other work being operated upon immediately at the rear of the cutting member 18.

The rollers 35 and 48 should be substantially equal in width and sufficiently long to prevent any possibility of angular movement of the tool with respect to the work upon which it is employed. The number of rollers engaging the work and the length of these rollers is such that, although the tool is tightly clamped about the pipe, the pressure will not be such as to cause inturning of the cut edges of the pipe sections as is the case when pipe cutters employing revolving cutting blades are used. The rapidity of the cutting action may be readily regulated by the hand wheel 25 and its feed screw and the gripping action exerted by the tool upon the work varied at will by turning of the adjusting nut 39. When the pipe, rod or other work being operated upon has been cut in two, the sections may be readily drawn from the tool, under most circumstances, without the necessity of loosening the gripping jaws and chain. However, under any circumstances, one or two turns of the adjusting nut 39 will be sufficient to free the tool from the work operated upon.

Although I have illustrated and described my improved cutting tool in all its details, it will of course be understood that I do not wish in any way to limit myself to the specific details of construction illustrated and described as various minor changes, within the scope of the appended claims, may be made at any time, if desired, without in the slightest degree departing from the spirit of my invention.

Having thus described the invention, what is claimed as new is:

1. A tool of the class described including a stock, a cutter mounted at one end of the stock, and work engaging means carried by the stock and adapted to clamp the tool with the cutter in engagement with the work, said means including work engaging jaws swingingly connected to the stock, and a flexible element having detachable engagement with the jaws and adapted to encircle the work.

2. A tool of the class described including a stock, a cutter mounted at one end of the stock, and work engaging means carried by the stock and adapted to clamp the tool with the cutter in engagement with the work, said means including work engaging jaws swingingly connected to the stock, and a flexible element having detachable engagement with the jaws and adapted to encircle the work, the work engaging jaws terminating in rollers which bear against the work.

3. A tool of the class described including a stock, a cutter mounted at one end of the stock, and work engaging means carried by the stock and adapted to clamp the tool with the cutter in engagement with the work, said means including work engaging jaws swingingly connected to the stock, and a flexible element having detachable engagement with the jaws and adapted to encircle the work, the flexible elements being constructed with rollers which engage against the work.

4. A tool of the class described including a stock, a cutter mounted at one end of the stock, and work engaging means carried by the stock and adapted to clamp the tool with the cutter in engagement with the work, said means including work engaging jaws swingingly connected to the stock, and a flexible element having detachable engagement with the jaws and adapted to encircle the work, the work engaging jaws and flexible element being provided with work engaging rollers.

5. A tool of the class described including a stock, a cutter mounted at one end of the stock, means for advancing and retracting the cutter, work-engaging jaws swingingly mounted upon the stock, a work engaging chain detachably connecting the jaws, and means for swinging the free ends of the jaws toward and away from each other.

6. A tool of the class described including a stock, a cutter mounted at one end of the stock and movable toward and away therefrom, primary work engaging jaws pivotally connected to the stock, a work embracing chain adapted for detachable connection with the jaws, and means for swinging the work engaging jaws toward and away from each other.

7. A tool of the class described including a stock, a cutter mounted at one end of the stock and movable toward and away therefrom, primary work engaging jaws pivotally connected to the stock, a work embracing chain adapted for detachable connection with the jaws, and means for swinging the work engaging jaws toward and away from each other, said means including a member slidably mounted on the stock, and secondary jaws pivotally connecting said sliding member with the free ends of the primary jaws.

8. A tool of the class described including a stock, a cutter mounted at one end of the stock and movable toward and away therefrom, primary work engaging jaws pivotally connected to the stock, a work embracing chain adapted for detachable connection with the jaws, and means for swinging the work engaging jaws toward and away from each other, said means including a member slidably mounted on the stock, secondary jaws pivotally connecting said sliding member with the free ends of the primary jaws, and means for reciprocating said sliding member.

9. A tool of the class described including a stock, a cutter reciprocably mounted at one end of the stock, primary jaws swingingly connected to the stock and provided with work engaging rollers at their free ends, a roller link chain having detachable engagement with said jaws and adapted to encircle the work, a ring slidably mounted on the stock, secondary jaws pivotally connecting the ring with the free ends of the primary jaws, an adjusting nut threaded upon the intermediate portion of the stock, and swiveled connecting means between the adjusting nut and ring.

10. A tool of the class described including a stock, a cutting tool holding chuck mounted for longitudinal movement in one end of the stock, means for advancing and retracting said chuck, means for holding the chuck against turning movement, work engaging jaws swingingly mounted upon the stock and provided with roller bearings at their free ends and intermediate of their length with outwardly directed hooks, a roller link chain adapted for detachable engagement with the hooks and arranged to embrace work being operated upon, and means for moving the jaws toward and away from each other to bring their rollers into engagement with the work and so tension the chain.

In testimony whereof I affix my signature in presence of two witnesses.

MARRIAM L. GILMOUR. [L. S.]

Witnesses:
LYLE J. GILMOUR,
SAMUEL F. LUPTON.